CARL HOFFMANN.
Improvement in Implement for handling Boxes and Packages.
No. 121,873. Patented Dec. 12, 1871.
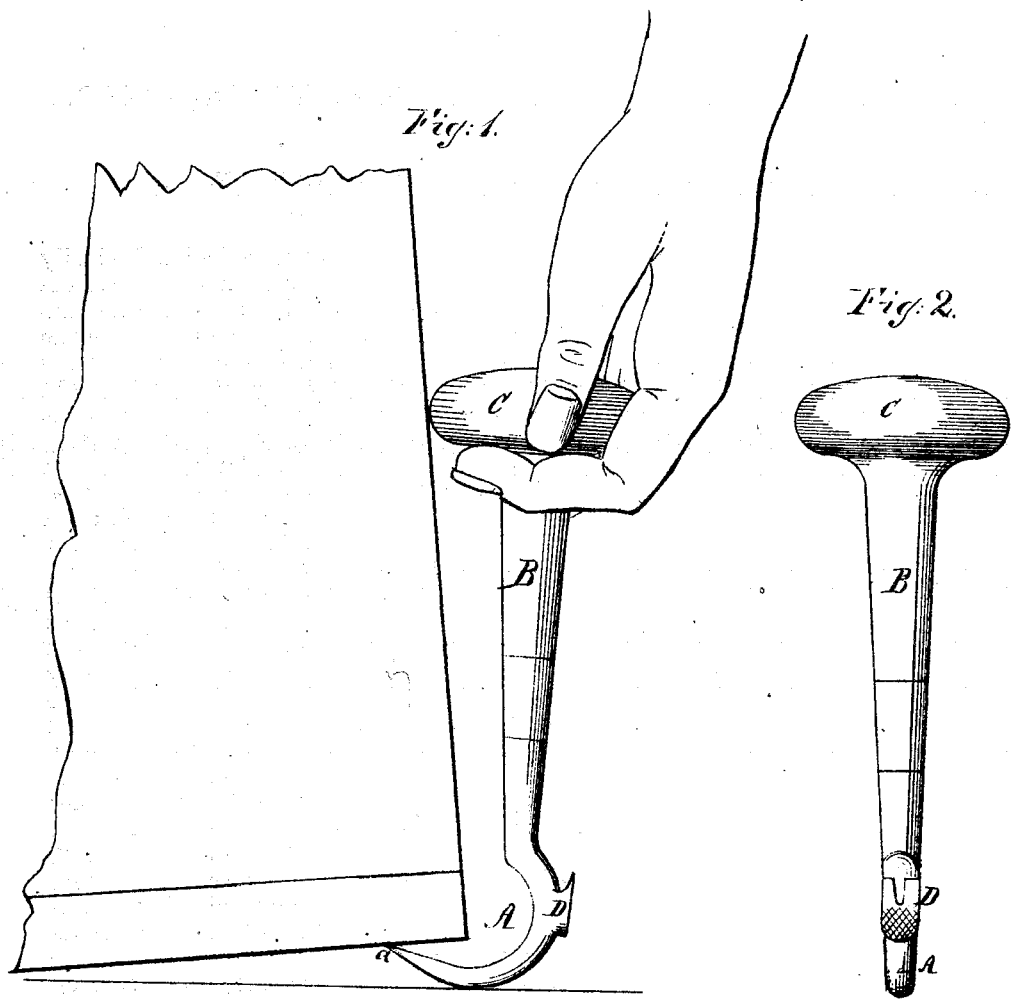

UNITED STATES PATENT OFFICE.

CARL HOFFMANN, OF NEW YORK, N. Y.

IMPROVEMENT IN IMPLEMENTS FOR HANDLING BOXES AND PACKAGES.

Specification forming part of Letters Patent No. 121,873, dated December 12, 1871.

*To all whom it may concern:*

Be it known that I, CARL HOFFMANN, of the city, county, and State of New York, have invented an Improvement in Implement for Handling Boxes and Packages; and I do hereby declare the following to be a full, clear, and exact description thereof, which will enable those skilled in the art to make and use the same, reference being had to the accompanying drawing forming part of this specification, in which drawing—

Figure 1 represents a side view of my invention. Fig. 2 is a rear view of the same.

Similar letters indicate corresponding parts.

This invention consists in the arrangement of a protecting-head on the end of the handle in such a manner that when the hook, with a packing-case bearing on its point, comes down upon the ground, the hand which grasps the handle is protected against being crammed in between the handle and the side of the packing-case. The end of my hook forms a sharp tapering point, so that the same, when applied to cotton-bales or wool-bags, will readily penetrate to a considerable depth, and thus the tearing of the covering is avoided; and, at the same time, the point of my hook can be used for making holes for nails. On the back of my hook is formed a claw for the purpose of extracting nails from packing-cases, while the face of said claw may be used as a hammer for driving nails.

In the drawing, A designates a packing-hook, the handle B of which is provided with head C to form a protection for the hand. If the handle of the hook is constructed in the ordinary manner, with a simple cross-bar, and the hook is applied to a packing-case and allowed to come down hard upon the ground with the case on, the pressure of the case on the point of the hook crowds the hand in between the handle and the side of the case, and in many instances the hand is badly injured. By the head C on my hook the hand is fully protected against all injury, for if said handle is forced up toward the side of the case the head strikes the case first, and the hand sustains no damage. The point $a$ of my hook is long and tapering, as shown in Fig. 1, so that when the same is applied to a cotton-bale or to a wool-bag, or to another package of similar nature, it will readily penetrate into the contents of the package to a considerable depth, and the covering of the package will be saved from being torn. My hook is also of great advantage when used for handling wooden cases, since, when the case is let down with the hook still attached to it, the same can be withdrawn from under the case, and the same is lowered upon the ground in an easy and safe manner by bending the handle of the hook out, which cannot be done with a hook of the ordinary construction on account of the cross-handle. The point of my hook is sharp-pointed, as shown, so that it can be used for opening holes for the reception of nails. On the back of the hook A is formed a claw, D, best seen in Fig. 2, which can be used for the purpose of extracting nails from packing-cases; and this claw is provided with a flat face that may be used as a hammer for driving nails.

What I claim as new, and desire to secure by Letters Patent, is—

The package-hook herein shown, consisting of the handle B, protecting-head C, claw D, and point $a$, constructed substantially as and for the purpose described.

This specification signed by me this 6th day of November, 1871.

CARL HOFFMANN.

Witnesses:
W. HAUFF,
E. F. KASTENHUBER.